(12) United States Patent
Potter

(10) Patent No.: US 12,013,125 B2
(45) Date of Patent: Jun. 18, 2024

(54) FIRE PIT

(71) Applicant: Green Earth Regeneration (Xiamen) Environmental Technology Co., Ltd., Fujian (CN)

(72) Inventor: Stephen Dale Potter, Xiamen (CN)

(*) Notice: Subject to any disclaimer, the term of this patent is extended or adjusted under 35 U.S.C. 154(b) by 442 days.

(21) Appl. No.: 17/400,096

(22) Filed: Aug. 11, 2021

(65) Prior Publication Data
US 2023/0048145 A1  Feb. 16, 2023

(51) Int. Cl.
*F24C 1/16* (2021.01)

(52) U.S. Cl.
CPC ....................... *F24C 1/16* (2013.01)

(58) Field of Classification Search
CPC ......... F24C 1/16; A47J 37/0763; F24B 1/182; F24B 3/00
USPC ........................................................ 126/151
See application file for complete search history.

(56) References Cited

FOREIGN PATENT DOCUMENTS

| CN | 113818480 A | * | 12/2021 | |
|---|---|---|---|---|
| WO | WO-2017181056 A1 | * | 10/2017 | ............... A47J 37/07 |
| WO | WO-2018142030 A1 | * | 8/2018 | ............ A47C 20/041 |

OTHER PUBLICATIONS 8020, 3203, 15 Series, 5/16-18 Steel Standard Drop in T-Nut—T Slot . . . , Mar. 18, 2014, www.amazon.com/16-18-Standard-Slide-T-Nut-Steel/dp/B09Z6VY6XM. (Year: 2014).*
Huber, Phil. "Build Your Own Cam Clamps." Woodsmith, Woodsmith Magazine, Jun. 11, 2020, www.woodsmith.com/article/build-your-own-cam-clamps/. (Year: 2020).*
Savage, Arthur Dekker. "DP." Amazon, Krill Press, Aug. 18, 2016, ww.amazon.com/dp/B06VTJZHS6/ref=sspa_dk_detail_4?psc=1&pd_rd_i=B06VTJZHS6&pd_rd_w=c8ta0&content-id=amzn1.sym.386c274b-4bfe-4421-9052-a1a56db557ab&pf_rd_p=386c274b-4bfe-4421-9052-a1a56db557ab&pf_rd_r=2NX6D4H3M5PY46X1V7E (Year: 2016).*
Shepherd Hardware 9908 1-Inch Felt Gard Threaded Stem Furniture Glides . . . , Jan. 21, 2014, www.amazon.com/shepherd-hardware-9908-threaded-furniture/dp/b00cxjrx7o. (Year: 2014).*

* cited by examiner

Primary Examiner — Allen R. B. Schult
Assistant Examiner — William C Weinert

(57) ABSTRACT

A fire pit includes a top plate, upright poles, side plates, and limiting members. The top plate has a central through hole and connecting parts on its lower surface. An upper end face of each upright pole is rotably connected to a corresponding one of the connecting parts in a snap-on manner. Each upright pole has mounting grooves its sides. The mounting grooves extend downwardly along an axial direction of the upright pole and pass a lower end face of the upright pole. Two ends of each side plate are insertedly connected to the mounting grooves of corresponding two of the upright poles from lower ends of the corresponding upright poles. The limiting members are movably connected to lower end portions of the sides of the respective upright poles for limiting and preventing the side plates from falling out of the mounting grooves of the upright poles.

5 Claims, 10 Drawing Sheets

FIRE PIT

BACKGROUND OF THE INVENTION

1. Field of the Invention

The present invention relates to a fire pit, and more particularly to a fire pit that is assembled and disassembled quickly.

2. Description of the Prior Art

A fire pit is generally provided with a gas burner or charcoal in its middle to achieve various functions such as barbecue and heating. It brings convenience for our daily life.

A traditional fire pit is generally built with bricks and cement, and is fixed on the ground and cannot be moved. When in use, the location of the user is limited. It is not adaptable enough for use. An improved fire pit is composed of metal plates and poles welded to the metal plates. It has a one-piece structure, and is large in size and heavy in weight. It is difficult to carry and change the position of the fire pit. The components of the fire pit are locked by screws, so it is inconvenient to assemble and disassemble the fire pit.

SUMMARY OF THE INVENTION

In view of the defects of the prior art, the primary object of the present invention is to provide a fire pit that is assembled and disassembled quickly. The components are assembled and disassembled quickly, which is convenient for storage and transportation. Besides, the connection of the components does not require screws, so it is easy to assemble and disassemble the fire pit.

In order to achieve the above objects, the present invention adopts the following technical solutions:

A fire pit comprises a top plate, a plurality of upright poles, a plurality of side plates, and a plurality of limiting members. The top plate has a central through hole and connecting parts on its lower surface corresponding in position to the respective upright poles. An upper end face of each upright pole is rotably connected to a corresponding one of the connecting parts in a snap-on manner. Each upright pole has mounting grooves on its sides. The mounting grooves each extend downwardly along an axial direction of the upright pole and pass a lower end face of the upright pole. Two ends of each side plate are insertedly connected to the mounting grooves of corresponding two of the upright poles from lower ends of the corresponding upright poles. The limiting members are movably connected to lower end portions of the sides of the respective upright poles for limiting and preventing the side plates from falling out of the mounting grooves of the upright poles.

Preferably, the connecting parts each include a connecting post welded to the lower surface of the top plate and a connecting sheet welded to a lower end face of the connecting post. The upper end face of each upright pole is rotably connected to the connecting sheet in a snap-on manner.

Preferably, the connecting sheet has a perforation, a limiting groove communicating with the perforation, and an arcuate notch. The limiting groove is located at a center of an imaginary circle defined by the circumferential contour of the arcuate notch. The upper end face of each upright pole is provided with two fasteners. A distance between the two fasteners is equal to a radius of the imaginary circle defined by the circumferential contour of the arcuate notch.

Preferably, the fasteners each include a cylinder connected to the upper end face of the corresponding upright pole and a disc connected to an upper end face of the cylinder. A diameter of the disc is greater than a width of the arcuate notch and less than a diameter of the perforation.

Preferably, the mounting grooves each have an opening provided with a pair of limiting flanges extending toward and facing each other. The two ends of each side plate are provided with anti-falling flanges. The anti-falling flanges are fitted in the mounting grooves and are located at inner sides of the limiting flanges, respectively.

Preferably, the limiting members each include a cam and a lever integrally connected with the cam. The cam is pivotally connected to the lower end portion of the corresponding side of the corresponding upright pole and is located beside the corresponding mounting groove. The lever is configured to operate and rotate the cam. When the cam is rotated, a far edge of the cam cooperates with the corresponding side plate to prevent the corresponding side plate from falling out of the corresponding mounting groove, or a proximate edge of the cam gives way to the corresponding side plate to be removed from the corresponding mounting groove.

Preferably, the fire pit further comprises foot pads each being threadedly connected to the lower end face of the corresponding upright pole through a screw.

With the above solution, the components of the fire pit provided by the present invention are movably connected and assembled. The components of the fire pit are independent of each other and occupy a small space after disassembly. It is convenient for transportation and saves storage costs. The upright poles are rotably connected to the top plate in a snap-on manner. The side plates are insertedly connected to the corresponding upright poles through the mounting grooves. The side plates are positioned by the limiting members, respectively. There is no need to use screws for fixing. The fire pit is assembled and disassembled with ease and high efficiency.

DETAILED DESCRIPTION OF THE PREFERRED EMBODIMENTS

Figure 1:
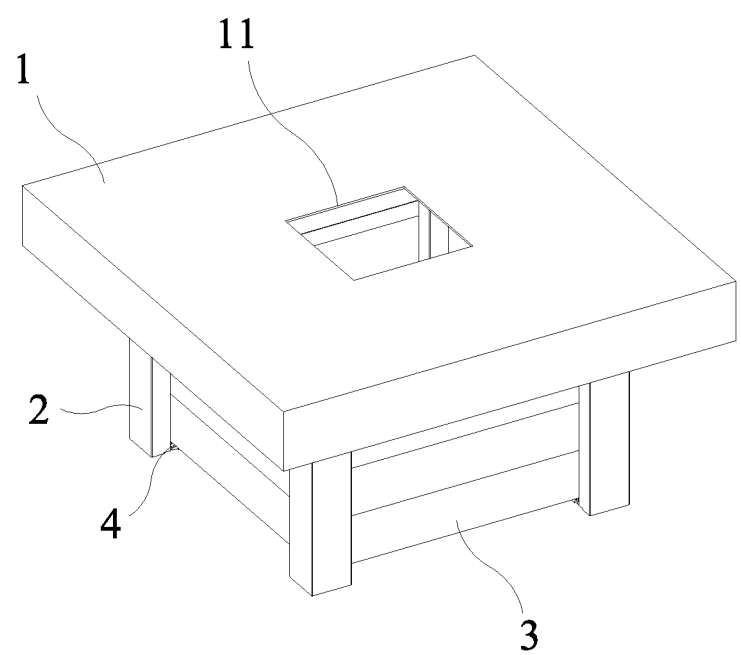
FIG. 1 is a perspective view of a preferred embodiment of the present invention.
Figure 2:
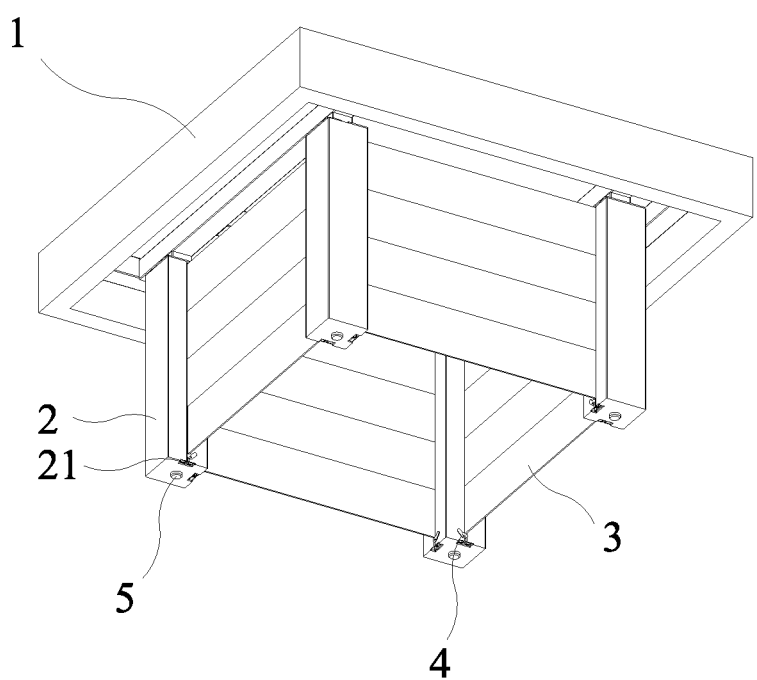
FIG. 2 is a perspective view seen from the bottom of the preferred embodiment of the present invention.
Figure 3:
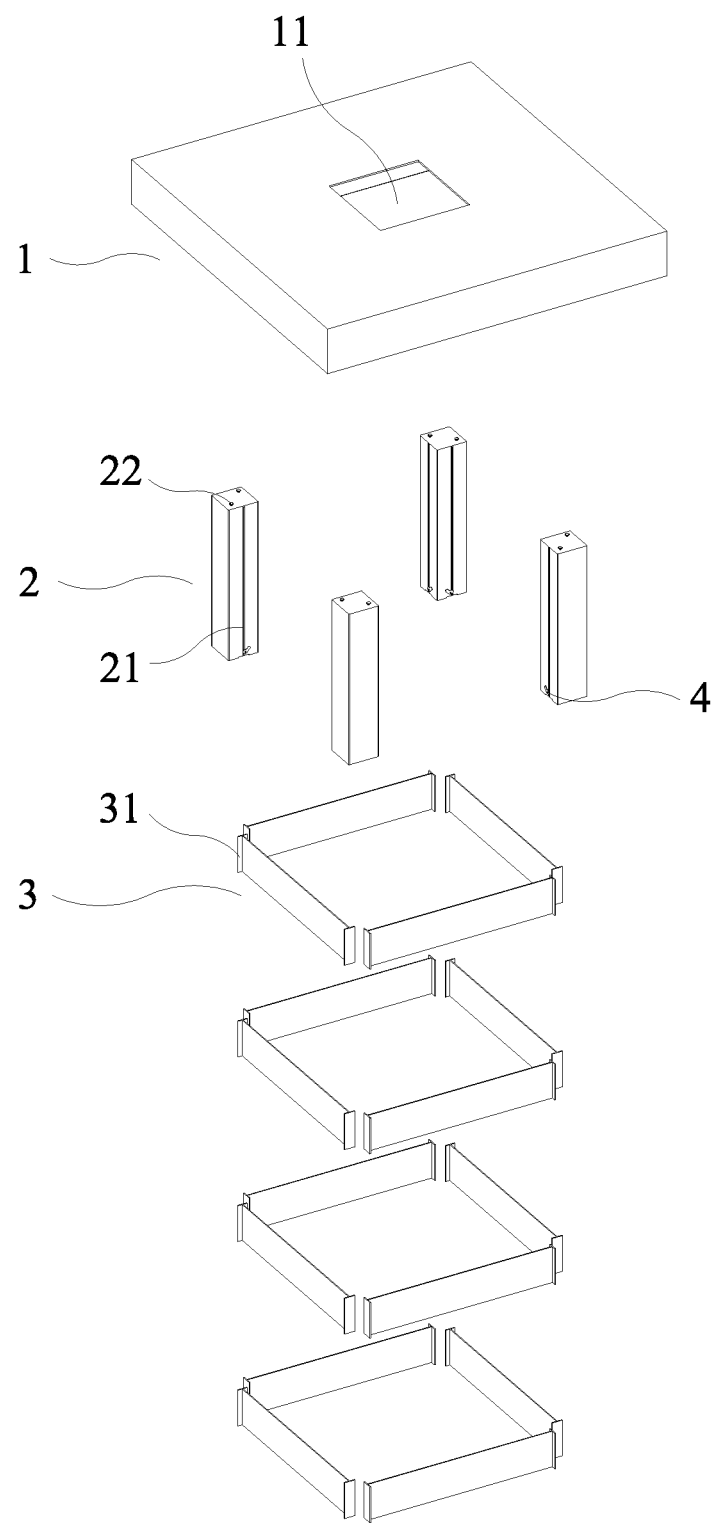
FIG. 3 is an explosive view seen from the top of the preferred embodiment of the present invention.
Figure 4:
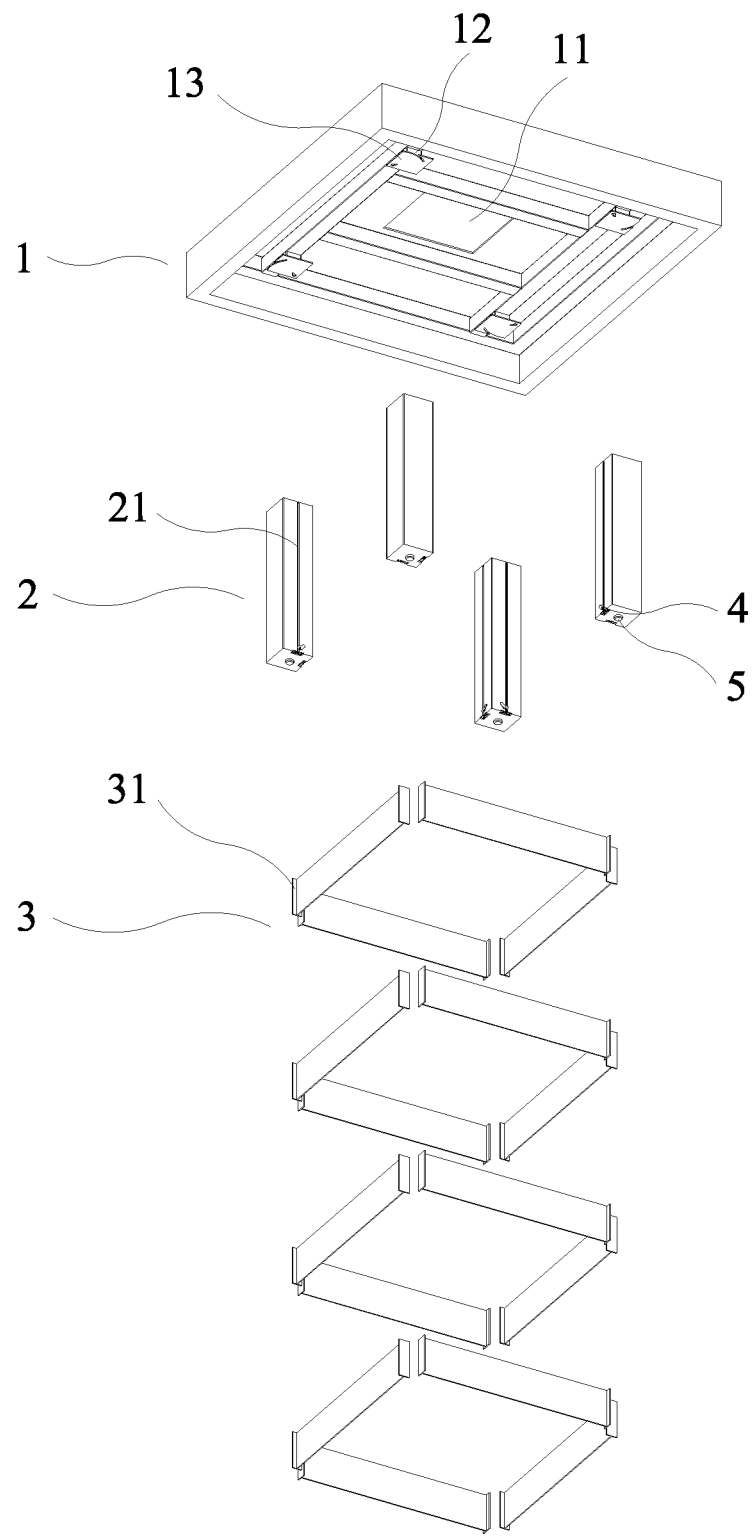
FIG. 4 is an explosive view seen from the bottom of the preferred embodiment of the present invention.
Figure 5:
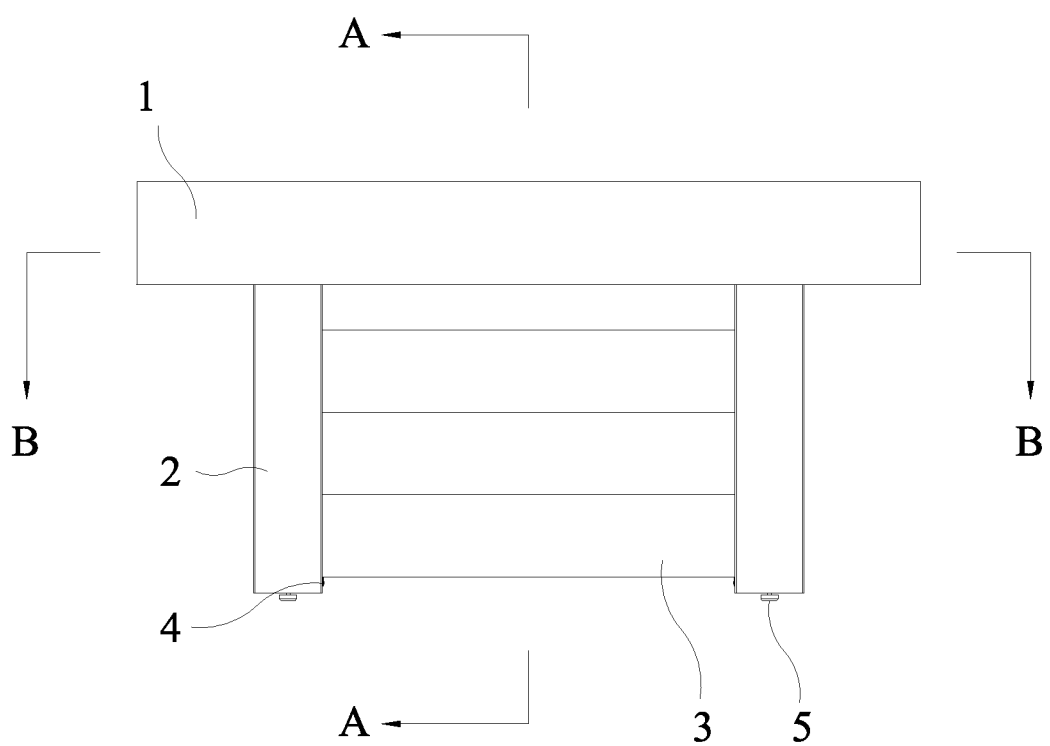
FIG. 5 is a front view of the preferred embodiment of the present invention.
Figure 6:
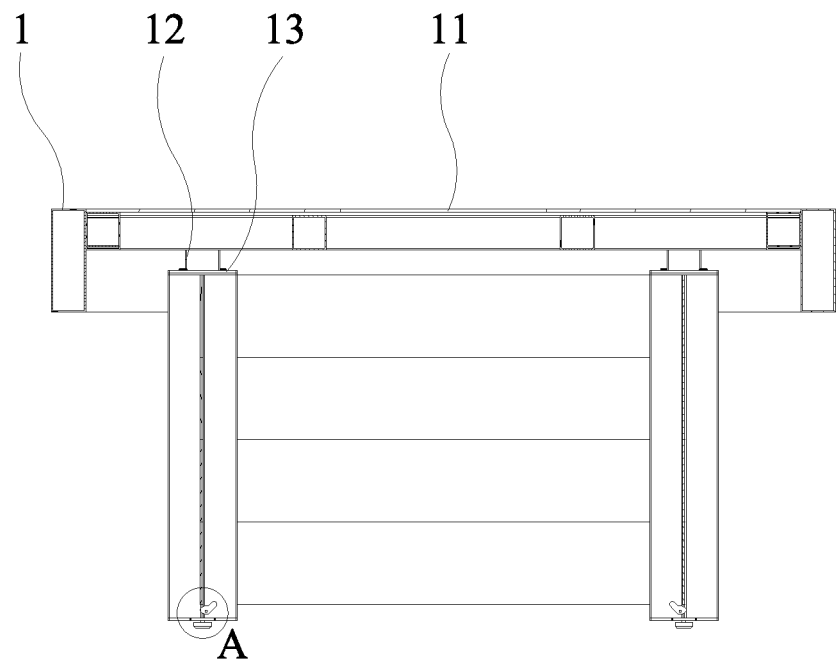
FIG. 6 is a cross-sectional view taken along line A-A of FIG. 5.
Figure 6A:
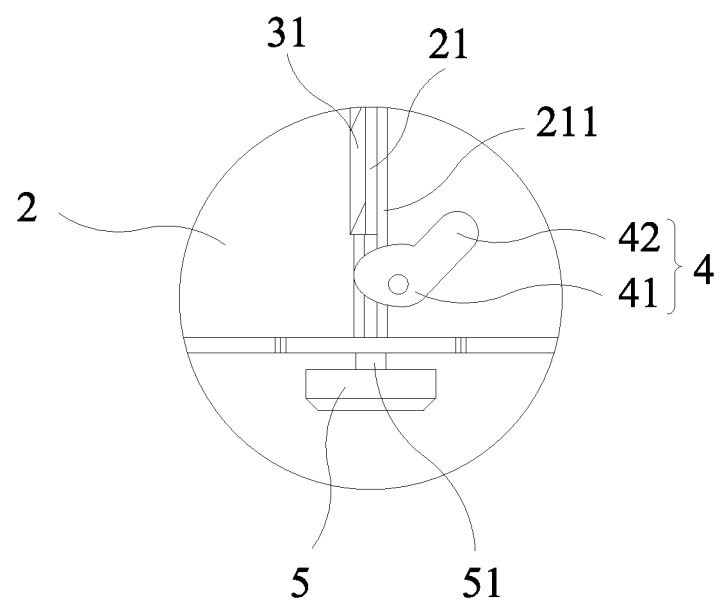
FIG. 6A is an enlarged view of circle A of FIG. 6.

Embodiments of the present invention will now be described, by way of example only, with reference to the accompanying drawings.

The present invention discloses a fire pit that is assembled and disassembled quickly, comprising a top plate 1, a plurality of upright poles 2, a plurality of side plates 3, and a plurality of limiting members 4.

The top plate 1 has a central through hole 11 and connecting parts on its lower surface corresponding in position to the respective upright poles 2.

An upper end face of each upright pole 2 is rotably connected to a corresponding one of the connecting parts in a snap-on manner. Each upright pole 2 has mounting grooves 21 on its sides. The mounting grooves 21 each extend downwardly along an axial direction of the upright pole 2 and pass a lower end face of the upright pole 2.

Two ends of each side plate 3 are insertedly connected to the mounting grooves 21 of corresponding two of the upright poles 2 from the lower ends of the corresponding upright poles 2.

The limiting members 4 are movably connected to the lower end portions of the sides of the respective upright poles 2 for limiting and preventing the side plates 3 from falling out of the mounting grooves 21 of the upright poles 2.

FIGS. 1 to 10 illustrate specific embodiments of the present invention.

The through hole 11 is a square hole corresponding in shape to a gas burner, so that the gas burner can be placed conveniently.

Figure 7:
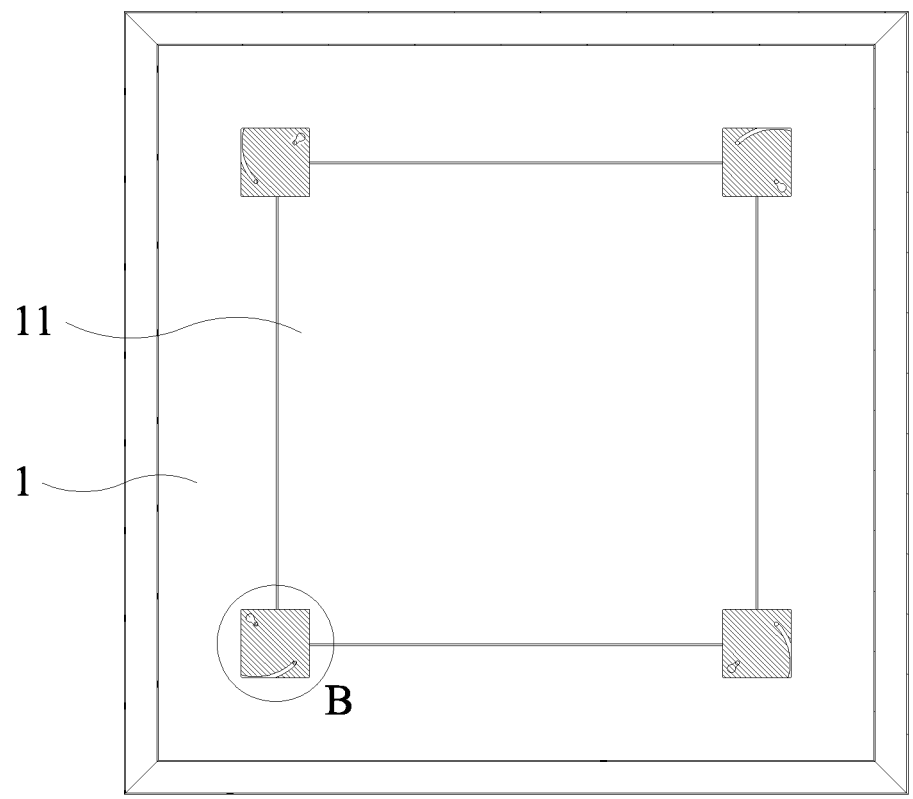
FIG. 7 is a cross-sectional view taken along line B-B of FIG. 5.
Figure 7A:
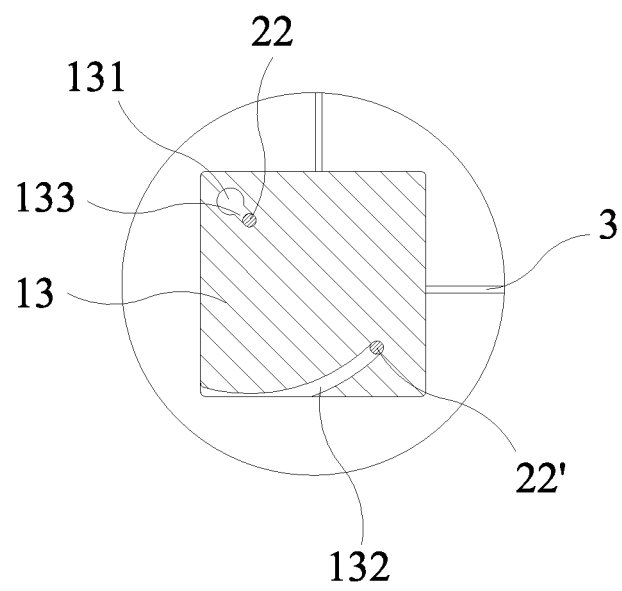
FIG. 7A is an enlarged view of circle B of FIG. 7.
Figure 8:
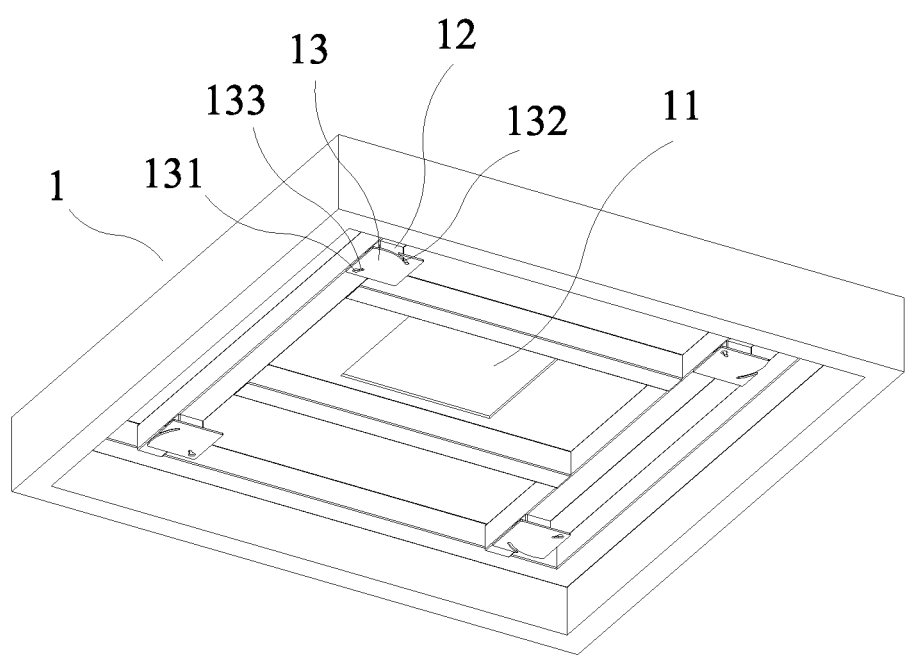
FIG. 8 is a perspective view of the top plate of the preferred embodiment of the present invention.

Each connecting part includes a connecting post 12 welded to the lower surface of the top plate 1 and a connecting sheet 13 welded to a lower end face of the connecting post 12. The upper end face of each upright pole 2 is rotably connected to the connecting sheet 13 in a snap-on manner. In this embodiment, the cross-sectional shape of the connecting sheet 13 is the same as that of the upright pole 2. The connecting sheet 13 has a perforation 131, a limiting groove 133 communicating with the perforation 131, and an arcuate notch 132. The limiting groove 133 is located at the center of an imaginary circle defined by the circumferential contour of the arcuate notch 132. The upper end face of each upright pole 2 is provided with two fasteners 22. The distance between the two fasteners 22 is equal to the radius of the imaginary circle defined by the circumferential contour of the arcuate notch 132. Referring to FIG. 7, when the top plate 1 and the upright pole 2 are to be assembled, one of the fasteners 22 is inserted into the through hole 131 and confined in the limiting groove 133, and the other fastener 22' is aligned with the arcuate notch 132 to be inserted in the arcuate notch 132, and the upright pole 2 is rotated to realize the connection between the upright pole 2 and the top plate 1. The fasteners 22 are configured to prevent the upright pole 2 from falling off. Furthermore, each fastener 22 includes a cylinder 221 connected to the upper end face of the corresponding upright pole 2 and a disc 222 connected to an upper end face of the cylinder 221. The diameter of the disc 222 is greater than the width of the arcuate notch 132 and less than the diameter of the perforation 131.

Figures 9A, 9B:
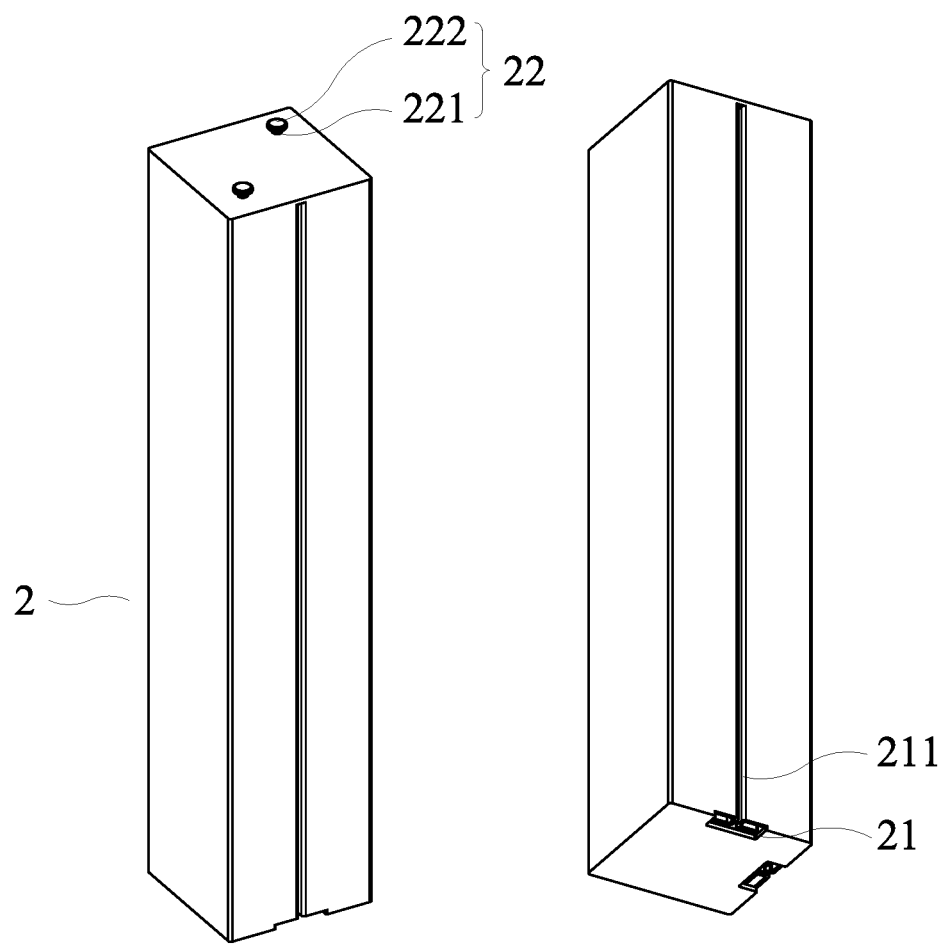
FIG. 9A is a perspective view of the upright pole seen from the top of the preferred embodiment of the present invention.
FIG. 9B is a perspective view of the upright pole seen from the bottom of the preferred embodiment of the present invention.
Figure 10:
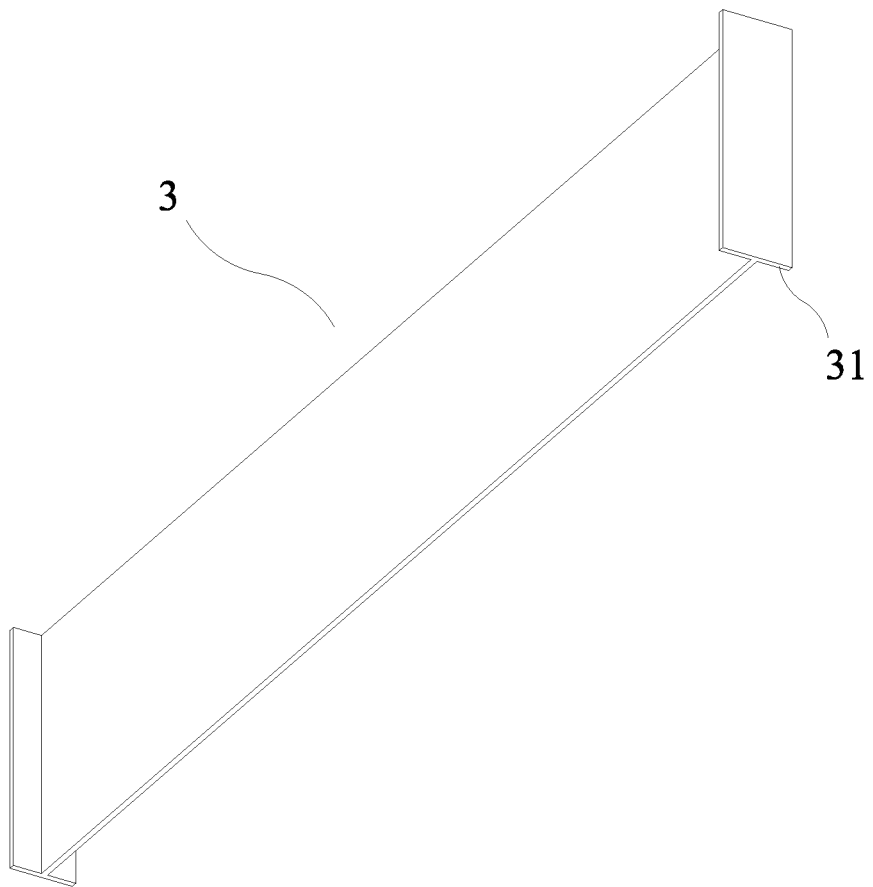
FIG. 10 is a perspective view of the side plate of the preferred embodiment of the present invention.

The mounting groove 21 has an opening provided with a pair of limiting flanges 211 extending toward and facing each other. Either end of each side plate 3 is provided with an anti-falling flange 31. The anti-falling flange is fitted in the mounting groove 21 and is located at the inner sides of the limiting flanges 211 to realize the horizontal limit of the side plate 3 and the upright pole 2. Referring to FIG. 9B and FIG. 10, the ends of the mounting groove 21 and the side plate 3 each have a T-shaped cross-section.

Each limiting member 4 includes a cam 41 and a lever 42 integrally connected with the cam 41. The cam 41 is pivotally connected to the lower end portion of the side of the corresponding upright pole 2 and is located beside the mounting groove 21. The lever 42 is configured to operate and rotate the cam 41. When the cam 41 is rotated, the far edge of the cam 4 cooperates with the side plate 3 to prevent the side plate 3 from falling out of the mounting groove 21, or the proximate edge of the cam 4 gives way to the side plate 3 to be removed from the mounting groove 21.

The fire pit further comprises foot pads 5 each being threadedly connected to the lower end face of the corresponding upright pole 2 through a screw 51. The distance between the foot pad 5 and the upright pole 2 is adjustable. In view of the uneven ground on site, the foot pad 5 under each upright pole 2 can be adjusted separately to achieve the purpose of stabilizing the fire pit.

The number of the upright poles 2 can be changed according to the actual needs of the product. In this embodiment, the number of the upright poles 2 is four to form a rectangle as a support for the fire pit. Similarly, the number and shape of the side plates 3 can be changed according to the actual needs. In this embodiment, the side plate 3 is designed to have a flat and elongate shape, which makes the volume of the side plate 3 smaller. One side of the fire pit may include plural side plates 3. It is more convenient for storage after the product is disassembled. The side plate 3 itself is relatively light. It is labor-saving to disassemble and assemble the side plates 3.

It should be noted that if the through hole 11 of the top plate 1 is blocked or the top plate 1 is directly made into a flat plate, the specific product of the present invention can be used as a table or similar furniture. It should be understood that it is still within the protection scope of the present invention. The feature of the present invention is how to realize the assembly and disassembly of the product to facilitate storage and transportation.

With the above solution, the components of the fire pit provided by the present invention are movably connected and assembled. The components of the fire pit are independent of each other and occupy a small space after disassembly. It is convenient for transportation and saves storage costs. The upright poles 2 are rotably connected to the top plate 1 in a snap-on manner. The side plates 3 are insertedly connected to the corresponding upright poles 2 through the mounting grooves. The side plates 3 are positioned by the limiting members 4, respectively. There is no need to use screws for fixing. The fire pit is assembled and disassembled with ease and high efficiency.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A fire pit, comprising a top plate, a plurality of upright poles, a plurality of side plates, and a plurality of limiting members;

the top plate having a central through hole and connecting parts on its lower surface corresponding in position to the respective upright poles;

an upper end face of each upright pole being rotatably connected to a corresponding one of the connecting parts in a snap-on manner, each upright pole having mounting grooves on its sides, the mounting grooves each extending downwardly along an axial direction of the upright pole and reaching a lower end face of the upright pole;

two ends of each side plate being insertedly connected to the mounting grooves of corresponding two of the upright poles from lower ends of the corresponding upright poles;

the limiting members being movably connected to lower end portions of the sides of the respective upright poles for limiting and preventing the side plates from falling out of the mounting grooves of the upright poles;

the connecting parts each include a connecting post welded to the lower surface of the top plate and a connecting sheet welded to a lower end face of the connecting post, and the upper end face of each upright pole is rotatably connected to the connecting sheet in a snap-on manner;

the connecting sheet has a perforation, a limiting groove communicating with the perforation, and an arcuate notch; the limiting groove is located at a center of an imaginary circle defined by a circumferential contour of the arcuate notch, the upper end face of each upright pole is provided with two fasteners, and a distance between the two fasteners is equal to a radius of the imaginary circle defined by the circumferential contour of the arcuate notch.

2. The fire pit as claimed in claim 1, wherein the fasteners each include a cylinder connected to the upper end face of the corresponding upright pole and a disc connected to an upper end face of the cylinder, and a diameter of the disc is greater than a width of the arcuate notch and less than a diameter of the perforation.

3. The fire pit as claimed in claim 1, wherein the mounting grooves each have an opening provided with a pair of limiting flanges extending toward and facing each other, the two ends of each side plate are provided with anti-falling flanges, and the anti-falling flanges are fitted in the mounting grooves and are located at inner sides of the limiting flanges, respectively.

4. The fire pit as claimed in claim 1, wherein the limiting members each include a cam and a lever integrally connected with the cam, the cam is pivotally connected to the lower end portion of the corresponding side of the corresponding upright pole and is located beside the corresponding mounting groove, the lever is configured to operate and rotate the cam, when the cam is rotated, a far edge of the cam cooperates with the corresponding side plate to prevent the corresponding side plate from falling out of the corresponding mounting groove, or a proximate edge of the cam gives way to the corresponding side plate to be removed from the corresponding mounting groove.

5. The fire pit as claimed in claim 1, further comprising foot pads each being threadedly connected to the lower end face of the corresponding upright pole through a screw.

* * * * *